Aug. 15, 1961 H. J. TROCHE ET AL 2,996,140
MOBILE AERIAL TOWER
Filed April 26, 1960 6 Sheets-Sheet 2

INVENTOR.
HERMAN J. TROCHE AND
BY GEORGE H. ECKELS

Teare & Fetzer
ATTORNEYS

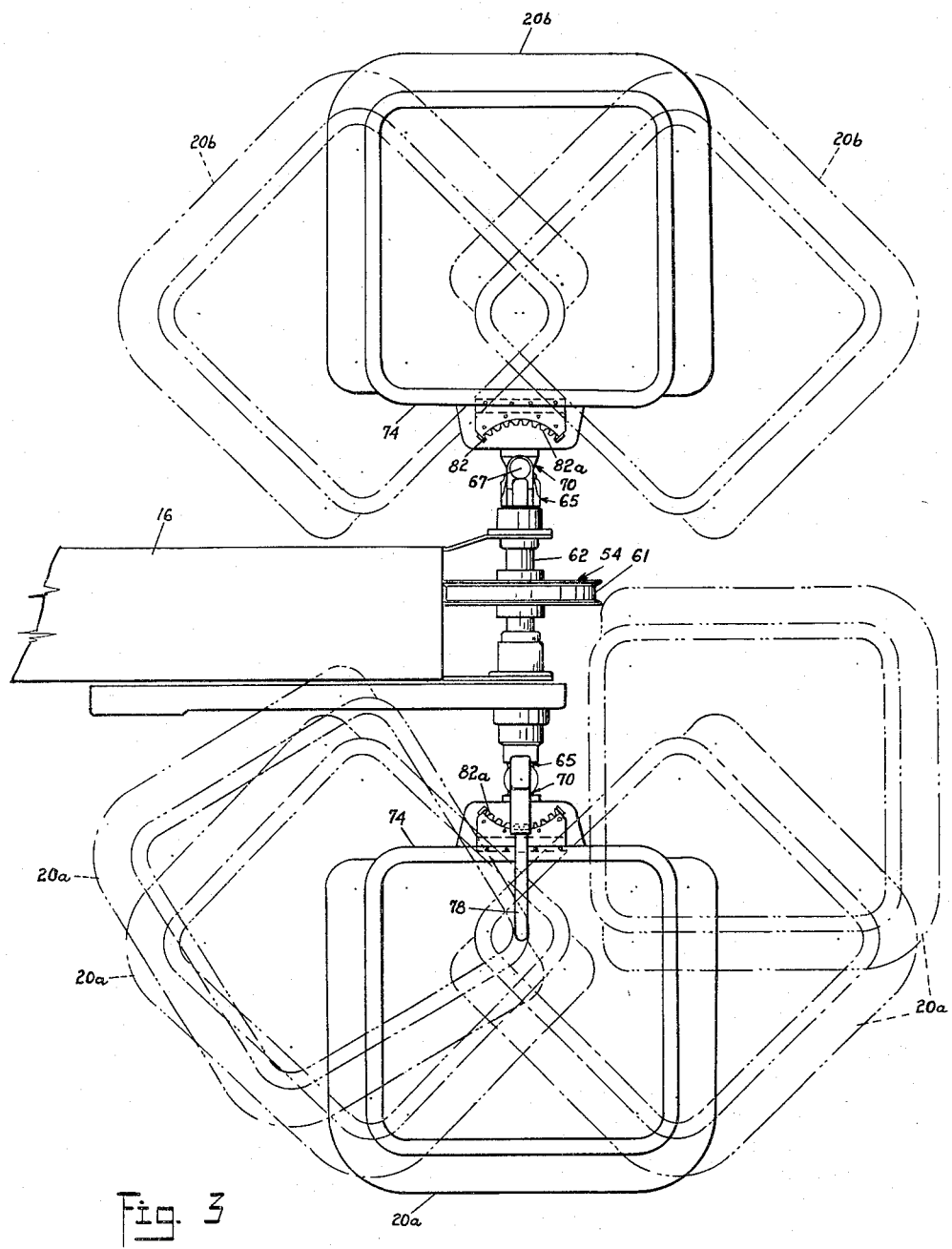

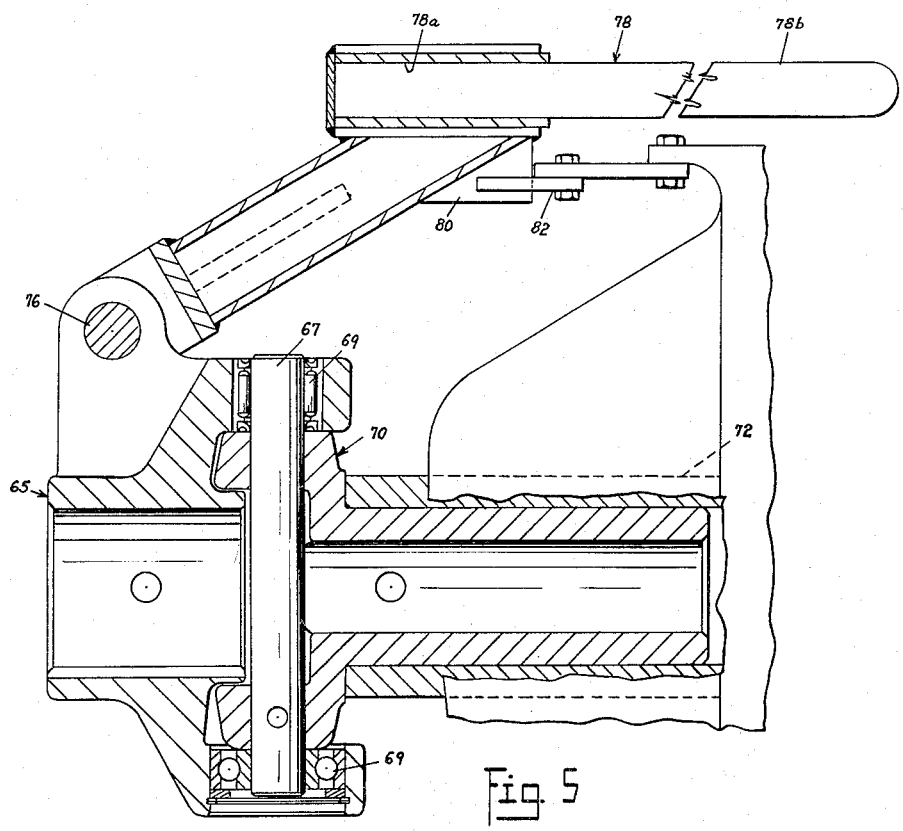
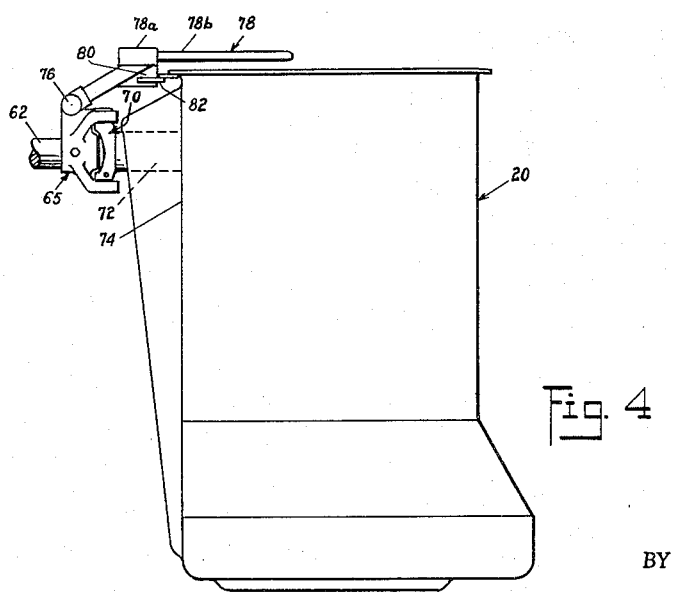

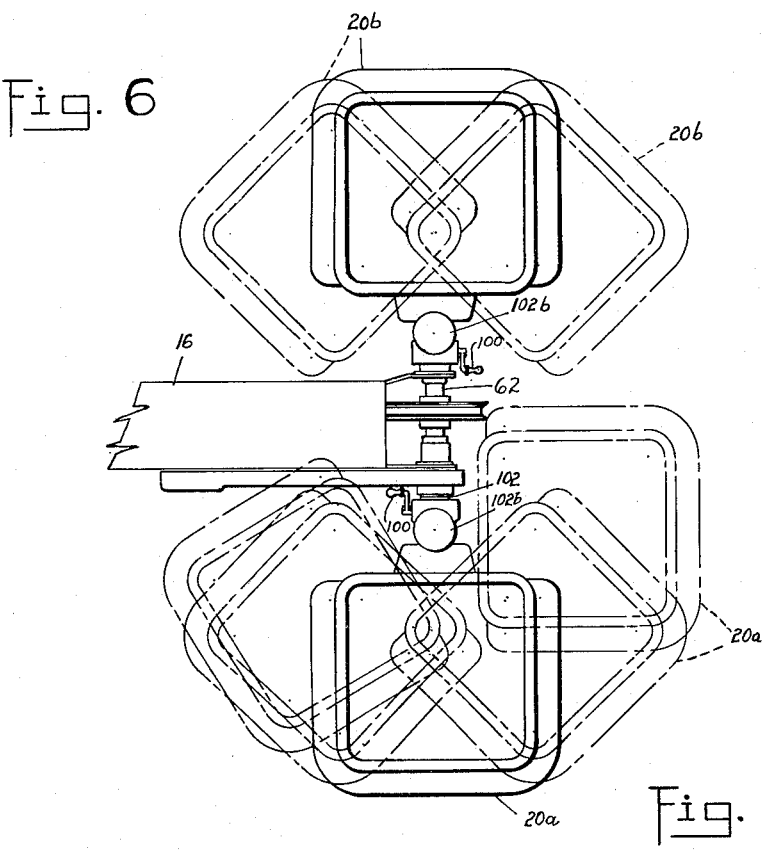
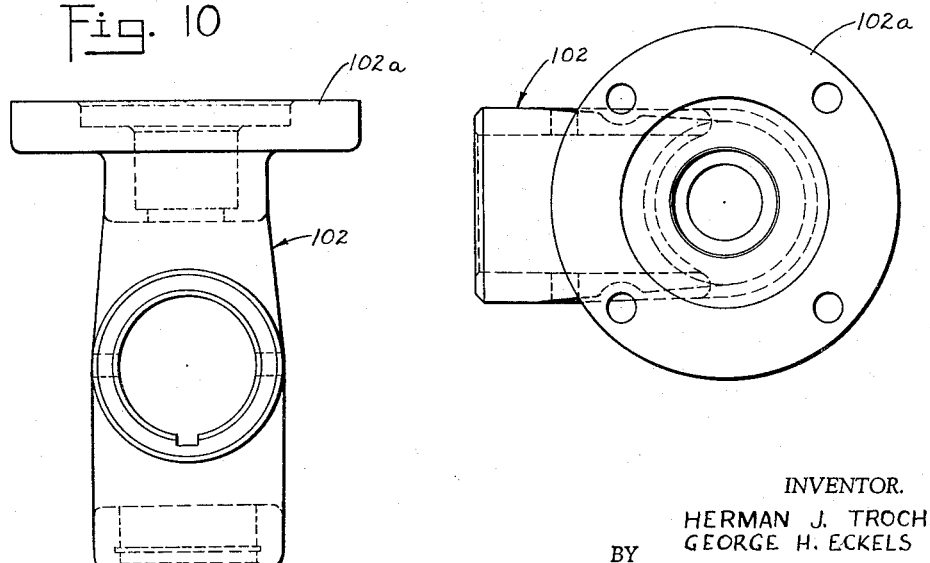
INVENTOR.
HERMAN J. TROCHE AND
GEORGE H. ECKELS
BY Teare & Fetzer
ATTORNEYS

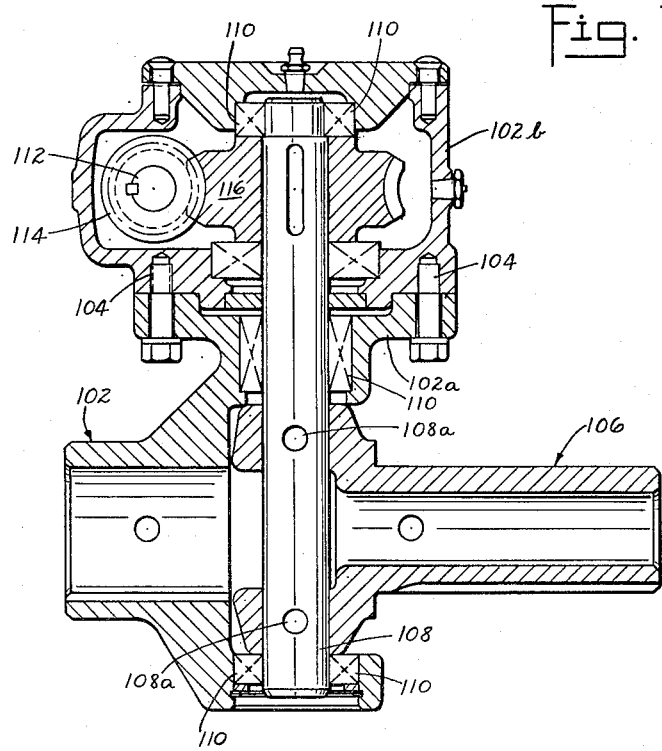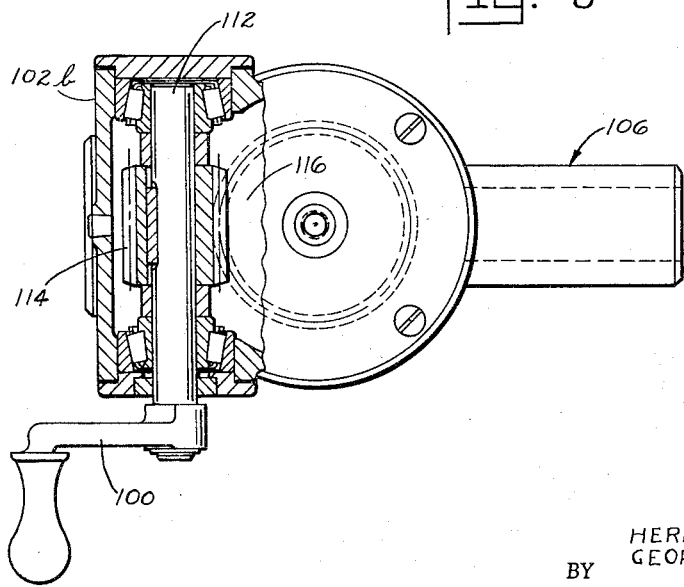

United States Patent Office 2,996,140
Patented Aug. 15, 1961

2,996,140
MOBILE AERIAL TOWER
Herman J. Troche, Fairview Park, and George H. Eckels, Lakewood, Ohio, assignors to Holan Corporation, Cleveland, Ohio, a corporation of Ohio
Filed Apr. 26, 1960, Ser. No. 24,704
7 Claims. (Cl. 182—2)

This invention relates to a mobile aerial tower comprising work platform structure mounted on the tower for supporting a workman.

Such towers are conventionally mounted on a trucklike vehicle, are preferably of the collapsible type, and may be used to provide access to traffic lights, street lamps, overhead power lines and similar objects for installation, maintenance and repair thereof.

The work platform structure is conventionally mounted on the outer end of the tower boom for pivotal movement in a generally vertical plane, and may include means for automatically maintaining the work platform structure level with respect to the horizontal for any tilted position of the tower throughout its operating range.

However, under certain operating conditions when the tower boom and associated work platform structure is positioned adjacent the object to be worked upon, the work platform structure is not able to be optimumly positioned with respect to the object irrespective of the positioning of the tower boom. One such instance is when the tower carrying vehicle is positioned adjacent the curb of a thoroughfare and the tower is raised to position the work platform adjacent the cross arms of a laterally disposed power line pole. In such a situation, the tower boom and associated work platform structure is disposed at an angle with respect to the lengthwise vertical center plane of the cross arms of the power pole. In order to give optimum working conditions to the workman on the platform structure and provide him with convenient access to the cross-arms of the power pole, it would be highly advantageous if the work platform structure were able to be disposed in generally confronting parallel relation to the aforementioned vertical center plane of the cross-arms. The latter is especially true if the work platform structure comprises a pair of work baskets at the outer end of the tower boom, each basket being adapted to carry at least one workman, so that both workmen could work then conveniently on the same side of the cross-arms of the power pole and at opposite ends thereof.

Accordingly, it is an object of the present invention to provide an aerial tower having a work platform structure operatively mounted thereon, which tower and work platform structure has an improved operating range of movement as compared to heretofore known arrangements.

Another object of the invention is to provide an aerial tower of the latter type including means providing for swinging the work platform structure with respect to the tower boom and in a generally horizontal plane.

A further object of the invention is to provide an aerial tower of the latter mentioned type, including means for locking the platform structure in its selected horizontal plane position within its operating range.

Briefly, the foregoing objects are accomplished by the provision of a mobile aerial tower having a tower boom on which is mounted a work platform structure for supporting a workman in the proximity of an object to be worked upon. Means is provided coacting between the work platform structure and the tower boom for movement of the work platform structure in a generally horizontal plane and with respect to the boom, together with means readily accessible to the workman on the platform structure for so moving the latter. Means may also be provided for locking the work platform structure in selected position in its generally horizontal plane of movement.

Other objects and advantages of the invention will be apparent from the following description taken in conjunction with the accompanying drawings in which.

FIG. 3 is an enlarged, fragmentary, top plan view of the work platform structure as mounted on the outer end of the tower boom for swinging movement in a generally horizontal plane and with respect to the boom, in full lines the conventional, generally perpendicular relation of the work baskets of the work platform structure with respect to the longitudinal vertical center plane of the boom is shown, and in phantom lines, various permissible angular positions of the work baskets with respect to the center plane of the boom are illustrated; in the interests of clarity, the operating handle mechanism for moving the work basket on the top side (as viewed in FIG. 3) has been eliminated.

FIG. 4 is a side elevational view of one of the work baskets as illustrated in FIG. 3, together with its articulated connection with the boom, and the operating handle, for moving the work basket in a generally horizontal plane.

FIG. 5 is an enlarged, fragmentary, partially sectioned view illustrating the articulated joint between one of the work baskets and the boom together with the operating handle or abutment for swinging the work basket in a generally horizontal plane, and the locking means for locking the work basket in selected position in its horizontal range of movement;

FIG. 6 is a view generally similar to FIG. 3, but illustrating a modification of the invention wherein gearing is utilized to swing the associated work basket;

FIG. 7 is an enlarged, fragmentary, vertical sectional view illustrating the articulated joint between one of the work baskets and the boom of the modification of FIG. 6, together with the rotary operating handle and associated gearing, for moving the work basket in a generally horizontal plane;

FIG. 8 is a partially broken, top plan view of the FIG. 7 illustration;

FIG. 9 is an enlarged, top plan view of the inner yoke member of the FIGS. 6 to 8 modified form of the invention;

FIG. 10 is an end elevational view of the FIG. 9 showing, taken from the left hand end thereof.

Figure 1:
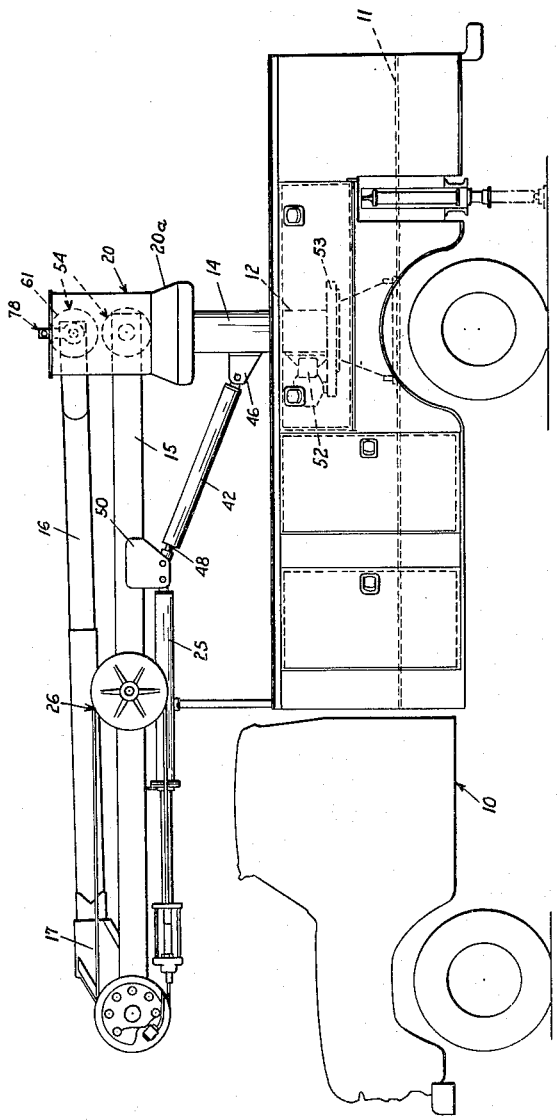
FIG. 1 is a side elevational view of a utility truck employing an aerial tower constructed in accordance with the invention.
Figure 2:
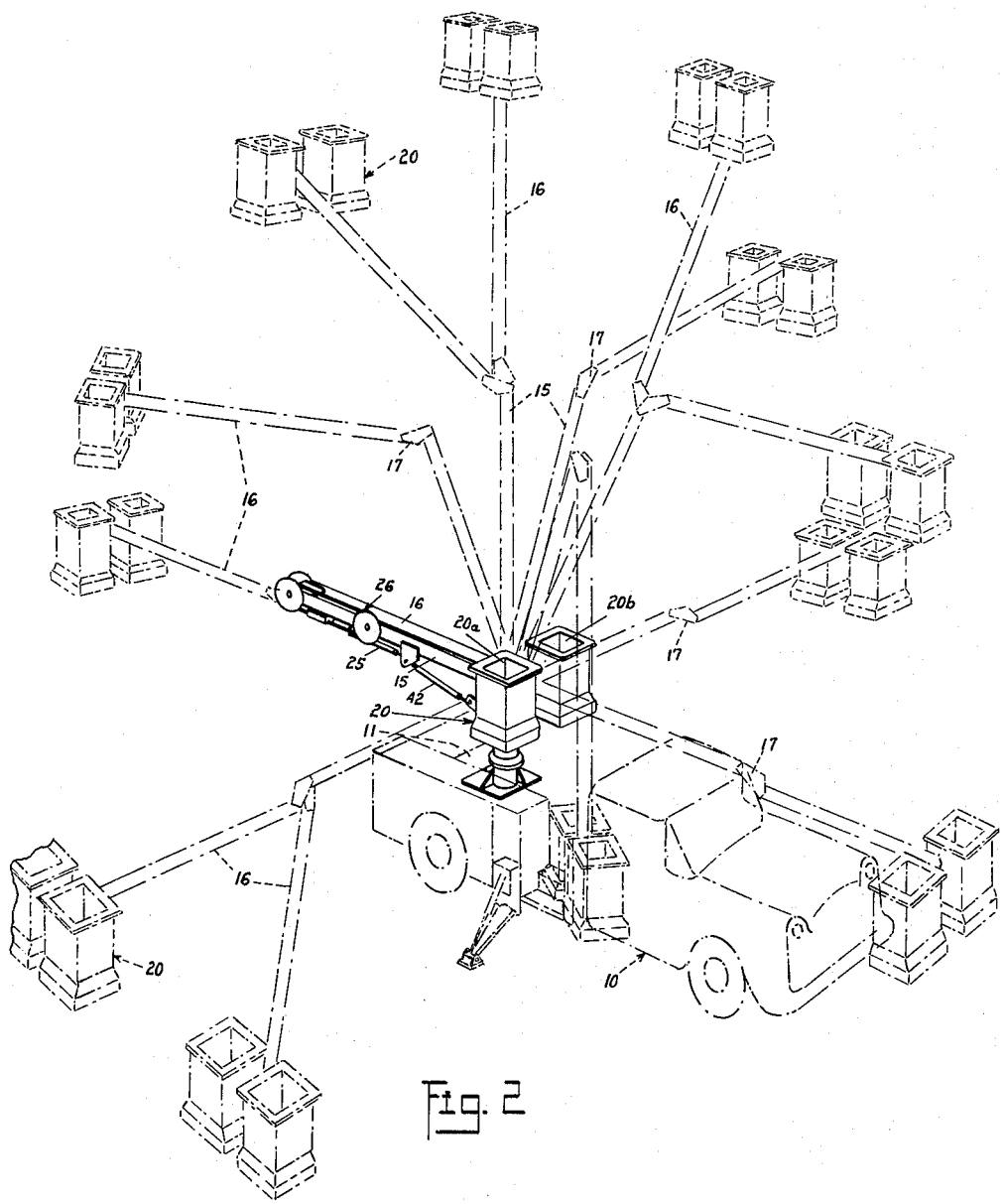
FIG. 2 is a perspective, generally diagrammatic view of the utility vehicle and mobile aerial tower of FIG. 1, illustrating in dot-dash lines various positions of the tower boom and associated work platform structure.

Referring now again to the drawings, and in particular to FIG. 1, there is shown a wheeled utility vehicle 10 having a truck body forming a base 11 which carries a vertical pedestal 12, the upper portion 14 of which is rotatable in a horizontal plane preferably through 360°, and supports a collapsible or articulated tower assembly at its upper extremity. Such tower assembly, as presently illustrated, includes a pair of preferably hollow tower boom members or sections 15 and 16, pivotally interconnected at one of their adjacent ends through a saddle member 17. Such pivotal construction enables the upper section 16 to be pivoted in a vertical plane relative to the lower section 15. Tower section 16 carries work platform structure 20 adjacent its free-extremity.

The upper tower section 16 may be pivoted or tilted relative to the lower tower section 15 by means of a fluid actuated double acting piston motor 25 and a coacting cable and sheave control system 26, the latter arrangement being known in the art and therefor not being discussed here in detail.

The lower tower section 15 may be tilted with respect to the mast 12 by means of a fluid actuated, double acting piston motor 42 having a cylinder anchored to a bracket 46 carried by the rotatable portion 14 of the mast. The piston rod 48 of the motor 42 is pivotally connected at its external extremity to a bracket 50 mounted intermediate the ends of the lower section 15 of the tower.

The upper portion 14 of the mast 12 may be rotated in a horizontal plane as by means of a two-way fluid actuated motor 52 which is provided with a driving connection with such upper portion and in any suitable manner, such as by means of the gearing 53 and in a manner well known in the art.

Thus, controlled operation of the collapsible tower assembly to position the work platform structure 20 to the desired work location is accomplished by selectively supplying operating fluid to each of the fluid motors 25, 42 and 52 through conventional fluid piping systems including fluid supply and return lines, such systems not being described in detail since they form no particularly novel part of the instant invention.

The work platform structure 20 may be automatically maintained in a level position with respect to the vehicle body 11 by means of a leveling cable and drum system 54, (FIGS. 1 and 3) the connecting elements or leveling cables of which are preferably disposed interiorly of the tower boom sections 15 and 16 and in a manner well known in the art. Reference is made to the United States Patent No. 2,881,030 issued April 7, 1959 to Herman J. Troche for more detailed description of such a leveling cable and drum system. The work platform structure may comprise one or more work baskets 20a, 20b disposed on a respective side of the tower boom and mounted in cantilever fashion thereon.

The leveling drum 61 of leveling system 54 is secured to a shaft 62 extending transversely adjacent the free end of the tower section 16, such shaft being suitably journaled for rotation on such tower section, to automatically maintain the work platform baskets 20a, 20b level with respect to the truck chassis and as aforementioned, throughout the operating range of the tower.

In accordance with the invention, an articulated or hinge connection is provided for each of the work platform baskets 20a, 20b for enabling movement of such platform structures in a generally horizontal plane and with respect to the tower boom. Since both articulated connections for the work platform baskets are identical, only one will be described in detail, with the component parts of the other being designated by similar reference numbers.

Referring now in particular to FIGS. 3, 4 and 5, such articulated connection structure comprises an inner yoke member 65 secured to the respective outer end of shaft 62. A vertically extending kingpin 67 (FIG. 5) is suitably journaled as by means of bearing elements 69 on yoke 65 and pivotally mounts an outer yoke member 70 thereon. Outer yoke 70 is secured to a hub or projection 72 extending from the inner side 74 of the respective work basket and is secured thereto. Thus, it will be seen that each of the work platform baskets is so mounted that it may be swung in a generally horizontal plane and with respect to the tower boom, but that such work platforms will still be maintained level with respect to the truck body as by means of the aforementioned leveling drum and cable mechanism 54.

Pivotally attached, as at 76, to the inner yoke 65 for movement in a generally vertical plane is an operating handle 78. Handle 78 comprises a socket portion 78a and a lever portion 78b which is detachably received in the socket portion 78a. With the construction shown, lever portion 78b is maintained in a generally horizontally extending position which is substantially perpendicular to the pivotal axis 67 of the outer yoke 70 with respect to the inner yoke 65 of the work platform connection.

Depending from handle 78 is a detent or abutment flange 80 (FIGS. 4 and 5) which is adapted for locking the respective work platform in selected position in its horizontal range of movement. In this connection a slotted or toothed locking plate 82 is secured to the inner side of the respective work platform 20a or 20b adjacent the upper edge thereof, said plate having a concaved shaped (in plan view), toothed configuration 82a as may be best seen in FIG. 3.

It will be seen therefore, that a workman positioned in a work basket, by merely lifting up on the lever portion 78b of the handle, will unlock detent 80 from interlocking coaction with the respective teeth of the locking plate 82. Then by applying sufficient sidewise leverage to the handle, the reaction through his body enables him to swing the work platform to either side of its usual perpendicular relation (as shown in full lines in FIG. 3) with respect to the longitudinal center plane of the tower boom and to an angled position, and then by lowering or pivoting the handle downwardly, he may once again interlock the work platform in its selected angled position in its horizontal range of movement. By removing the lever portion 78b from its socket 78a, the lever may be removed from interfering relation with the work space in the respective work basket.

Referring now to FIGS. 6 to 10 inclusive, there is disclosed a modification of the invention. In this embodiment, gearing is utilized to transmit power from a rotary handle 100, adapted for actuation by a workman, and the respective work basket 20a or 20b. Such an arrangement comprises an inner yoke member 102 secured to the respective end of shaft 62, and which has an upper section 102a, which in the form illustrated is of circular, flange-like configuration, supporting a housing 102b thereon and attached thereto as by means of fasteners 104. Outer yoke member 106 is generally similar to that of the first described embodiment, and supports a kingpin 108 thereon, as at 108a. Kingpin 108 is journalled, as by means of bearing elements 110, for rotation about its vertical axis, and with respect to inner yoke member 102. The rotary shaft 112 of aforementioned operating handle 100 has a worm gear 114 secured thereto, such gear 114 being in meshing relation with wheel gear 116, which is secured to kingpin 108. Thus upon rotation of handle 100, the power is transmitted from the worm gear 112 to the kingpin 108 via gear 116, thus causing swinging movement in a horizontal plane of outer yoke 106 with respect to inner yoke 102, and thereby swinging the associated workbasket to which the outer yoke 106 is connected. The inherent friction between the parts and the helix angles of the gearings' teeth, provide sufficient resistance to inadvertent movement of the respective work basket with respect to the inner yoke 102. Housing 102b provides protection for the gearing as well as an enclosure for retaining lubricant to lubricate the power transmitting parts of the mechanism. As can be seen from FIG. 6, the modified form of the invention may provide for a generally similar range of horizontal movement for the respective work basket, as the first described embodiment of the invention.

Although the invention has been described with reference to a mobile aerial tower comprising a pair of pivotally interconnected tower sections and with a pair of work platform structures mounted thereon, it will be understood that the invention may be applied to an aerial tower having only one tower section or a greater plurality of such tower sections and in connection with such a tower embodying only one work platform basket therewith.

The terms and expressions which have been employed are used as terms of description and not of limitation, and there is no intention in the use of such terms and expressions of excluding any equivalents of any of the features shown or described or portions thereof, but it is recognized that various modifications are possible within the scope of the invention claimed.

We claim:

1. In a mobile aerial tower comprising a base, a boom structure having one end thereof mounted on said base for tilting movement in a generally vertical plane and for rotational movement in a generally horizontal plane, a shaft rotatably mounted adjacent the free end of said boom structure and extending transversely thereof and laterally with respect thereto, a first yoke member connected to said shaft, a second yoke member, a vertical pin operably connecting said first yoke member to said second yoke member for swinging movement of said second yoke member with respect to said first yoke member and in a generally horizontal plane, said second yoke member being operably connected to a work platform and supporting the latter on said first yoke member, a lever pivotally mounted on said first yoke member for movement in a generally vertical plane and extending outwardly from said first yoke member toward said work platform, detent means on said lever, means on said work platform adapted for interlocking coaction with said detent means to maintain said work platform in its selected position within its horizontal range of movement, said lever providing an abutment for a workman on said work platform to apply a reaction force to said work platform and thus move the latter in said horizontal plane, said lever upon pivotal movement thereof in a predetermined direction causing separation of said detent means from said means on said work platform to permit movement of the latter in said horizontal plane.

2. In a mobile aerial tower comprising a base, a boom structure having one end thereof mounted on said base for tilting movement in a generally vertical plane and for rotational movement in a generally horizontal plane, a shaft rotatively mounted on said boom structure adjacent the free end thereof and extending laterally of said boom structure, a work platform, an articulated connection operably supporting said work platform on said shaft for swinging movement of said work platform in a generally horizontal plane and with respect to said boom structure, means coacting with said shaft to automatically rotate the latter in a direction to maintain the work platform horizontal with respect to said base throughout the operating range of said boom structure, abutment means mounted on said shaft and being accessible from said work platform to enable a workman on said work platform to apply a reaction force to said work platform and swing the latter in said horizontal plane about said articulated connection, and means for locking said work platform in selected position within its horizontal range of movement and with respect to said boom structure.

3. In a mobile aerial tower comprising a base, a pair of tower sections providing a boom structure, said sections being pivotally interconnected in end-to-end relation for relative articulated movement in a vertical plane, the free end of one of the sections being mounted on the base for rotation in a horizontal plane, a shaft rotatively mounted adjacent the free end of the other of said sections and extending laterally to either side of said boom structure, a pair of work platforms disposed on opposite sides of said boom structure, a hinge joint connecting a respective one of said work platforms to the respective end of said shaft for mounting said work platforms on said shaft for swinging movement in a generally horizontal plane and with respect to said boom structure and said base, means coacting with said shaft to automatically rotate the latter in a direction to maintain the work platforms horizontal with respect to said base throughout the operating range of said boom structure, a pair of levers pivotally mounted on said shaft for movement in generally vertical planes, each of said levers extending outwardly with respect to said boom and toward a respective one of said work platforms whereby the levers are accessible to a workman adapted to be located on each of the work platforms, means on each of the levers adapted for interlocking coaction with means on the respective of the work platforms to maintain said work platforms in their selected positions within their horizontal range of movement, each of said levers providing an abutment for a workman adapted to be carried on the respective work platform to apply a reaction force to the respective work platform and thus move the latter in said horizontal plane, each of said levers upon pivotal movement thereof in an upward direction causing separation of the locking means on the respective lever and work platform to permit movement of the latter in said horizontal plane.

4. In a mobile aerial tower comprising a base, a boom structure having one end thereof mounted on said base for tilting movement in a generally vertical plane and for rotational movement in a generally horizontal plane, a shaft rotatably mounted adjacent the free end of said boom structure and extending transversely thereof and laterally with respect thereto, a first yoke member connected to said shaft, a second yoke member, a vertical pin operably connecting said first yoke member to said second yoke member for swinging movement of said second yoke member with respect to said first yoke member and in a generally horizontal plane, means fixing said pin to said second yoke member, said second yoke member being operably connected to a work platform and supporting the latter on said first yoke member, a rotary handle supported by said first yoke member in accessible relation to said work platform, a worm gear coupled to said handle, and a wheel gear coupled to said pin and disposed in meshing relation with said worm gear, said gears being adapted to transmit power from said handle to said pin to cause rotation of the latter upon actuation of said handle and thus cause swinging of said platform in a generally horizontal plane and with respect to said boom structure.

5. In an aerial tower, comprising a boom, a work platform mounted on said boom, and means for providing for movement of said platform in a generally horizontal plane and with respect to said boom, said means comprising an articulated connection between said boom and said work platform, said connection comprising an inner yoke member supported by said boom and an outer yoke member pivotally connected at one end to said inner yoke member and at the other end thereof being coupled to said platform, a housing supported by said inner yoke member, gearing means disposed in said housing, and a rotary handle supported by said housing, said gearing means coacting between said handle and said outer yoke member for swinging the latter about a vertical axis and with respect to said inner yoke member upon actuation of said handle.

6. In a mobile aerial tower comprising a base, a boom structure having one end thereof mounted on said base for tilting movement in a generally vertical plane and for rotational movement in a generally horizontal plane, a transverse shaft rotatably mounted on said boom structure adjacent the free end thereof and extending laterally of said boom structure, a work platform, an articulated connection operably supporting said work platform on said shaft for swinging movement of said work platform in a generally horizontal plane and with respect to said boom structure, means coacting with said shaft to automatically rotate the latter in a direction to maintain the work plaform horizontal with respect to said base throughout the operating range of said boom structure, and manually actuated operating means supported by said shaft in accessible relation to said work platform to cause swinging movement of said work platform in a generally horizontal plane and with respect to said boom.

7. In an aerial tower comprising a boom, a work platform mounted on said boom, and means for providing for movement of said platform in a generally horizontal plane and with respect to said boom, said means comprising an articulated connection between said boom and said work platform, said connection comprising an inner yoke member supported by said boom and an outer yoke member pivotally connected at one end to said inner yoke member and at the other end thereof being coupled to said platform, platform actuating gearing means supported by one of said yoke members, and a rotary handle supported by said one yoke member and operably connected to said gearing means, said gearing means coacting between said handle and the other of said yoke members for swinging said outer yoke member and coupled platform about a vertical axis and with respect to said inner yoke member upon actuation of said handle.

References Cited in the file of this patent

UNITED STATES PATENTS

| | | |
|---|---|---|
| 1,722,402 | Veilleux | July 30, 1929 |
| 2,187,283 | Scheutz | Jan. 16, 1940 |
| 2,211,088 | Arnold | Aug. 31, 1940 |
| 2,674,500 | Hukari | Apr. 6, 1954 |
| 2,917,137 | Troche | Dec. 1, 1959 |